United States Patent [19]

Dehart et al.

[11] 4,343,194

[45] Aug. 10, 1982

[54] FLOW SENSING APPARATUS

[75] Inventors: Marv L. Dehart, Mesquite; M. Leon Kloostra, Rowlett; Harold E. Straub, Garland, all of Tex.

[73] Assignee: Environmental Elements Corporation, Baltimore, Md.

[21] Appl. No.: 121,726

[22] Filed: Apr. 8, 1980

Related U.S. Application Data

[63] Continuation-in-part of Ser. No. 849,403, Nov. 7, 1977.

[51] Int. Cl.³ ............................................... G01F 1/46
[52] U.S. Cl. ................................................. 73/861.65
[58] Field of Search ......................... 73/861.65–861.68

[56] References Cited

U.S. PATENT DOCUMENTS

| | | | |
|---|---|---|---|
| 2,283,045 | 5/1942 | Carbonara | 73/861.68 |
| 2,315,756 | 4/1963 | Warner | 73/861.65 |
| 2,381,327 | 8/1945 | Woodman et al. | 73/861.68 |
| 2,995,932 | 8/1961 | Hardgrave, Jr. | 73/861.65 |
| 3,030,807 | 4/1962 | Scadron | 73/861.68 |
| 3,097,528 | 7/1963 | Mohring | 73/861.68 |
| 3,267,992 | 8/1966 | Werner et al. | 73/861.68 |

Primary Examiner—Herbert Goldstein
Attorney, Agent, or Firm—Herbert J. Zeh, Jr.; Oscar B. Brumback

[57] ABSTRACT

A flow sensing apparatus having increased sensitivity is disclosed for sensing the flow of gas, particularly through a confined passage such as the ducts in heating, ventilating and air conditioning systems. The flow sensing apparatus comprises a tube divided by a wall into an upstream chamber and a downstream chamber. The upstream chamber can have a constant orifice but preferably the walls of the tube in the upstream end are tapered to form a tapered chamber section. A total pressure sensing probe is located in the center of the tube and has its opening in the upstream chamber of the tube. The total sensing probe has its opening parallel to the flow of gas and facing upstream, the opening of the total pressure sensing probe preferably being in the wall dividing the tube into the upstream and downstream chambers. A static pressure sensing probe is located in the downstream chamber. The static pressure probe may be located in the walls of the tube and have its opening perpendicular to the flow of gas. Alternatively the static pressure probe may be located in the wall dividing the tube into chambers with its opening parallel to the flow of gas and facing downstream. The sensing probes may be connected to a measuring device that provides a readout of the sensed pressures or pressure differential or to a control unit that is responsive to the sensed pressures or pressure differential.

4 Claims, 4 Drawing Figures

FLOW SENSING APPARATUS

CROSS REFERENCE TO RELATED APPLICATIONS

This application is a continuation-in-part of application Ser. No. 849,403 filed Nov. 7, 1977.

BACKGROUND OF THE INVENTION

The present invention is directed to an apparatus for sensing the total pressure and static pressure of a gas flowing in a passage. The flow or velocity pressure may be readily obtained from these sensed conditions of pressure and a control function can be accomplished by using either the total pressure and static pressure values or the velocity pressure value.

Various devices have been proposed in the past for sensing the flow of gas, particularly in a confined passage, such as the ducts in heating, ventilating and air conditioning systems. Many of the devices have been based on Pitot tubes or modified Pitot tubes. These devices have not been entirely satisfactory because of their low sensitivity, particularly at low flow velocities. Many of the devices have also been based on venturi type arrangements; however, the venturi arrangements have not been entirely satisfactory, particularly at low velocities.

It is therefore the object of the present invention to provide a flow sensing apparatus that has increased sensitivity even at low flow velocities.

SUMMARY OF THE INVENTION

The present invention provides a flow sensing apparatus for gases having increased sensitivity even at low flow velocities. For achieving the increased sensitivity the apparatus has a tube divided by a wall into an upstream chamber and a downstream chamber. The upstream chamber can have a constant orifice but preferably the walls are tapered to form a tapered chamber section. A total sensing probe is located in the center of the tube and has its opening in the upstream chamber of the tube. The total sensing probe has its opening parallel to the flow of gas and facing upstream. The opening of the total pressure sensing probe is preferably in the wall dividing the tube into upstream and downstream chambers. A static pressure sensins probe is located in the walls of the tube in the downstream chamber and has its opening perpendicular to the flow of gas. The static pressure sensins probe may also be located in the wall dividing the tube into the upstream and downstream chambers in which case the opening is parallel to the flow of gas and facing downstream. The flow pressure or velocity of the flowing gas is sensed by comparing the sensed total pressure and the sensed static pressure. The total pressure being equal to the sum of the static pressure and the velocity pressure.

The apparatus of the present invention may have both probes connected to a guage thus providing a visual readout based on the difference between the sensed total pressure and the sensed static pressure. This difference between the sensed total pressure and the sensed static pressure. This difference being an indirect means of sensing the velocity pressure. Alternatively, the probes may be connected to a pressure responsive control device that is used to control the parameters of some operation such as the flow of air through a duct. It is believed that the present sensing apparatus will have its widest application in controlling the flow of air in heating, ventilating and air conditioning systems.

The location of the static pressure sending probe in the downstream chamber of the tube is believed to amplify the sensed pressure differential by reducing the sensed static pressure. The flow or air around the tube causes a false static pressure reading in the downstream chamber that is lower than the true static pressure of the system. The area in the downstream chamber has an artificially reduced static pressure. By locating the static pressure probe in the downstream chamber where the sensed static pressure is artificially depressed, a larger pressure differential between total pressure and static pressure is obtained. This amplification of the pressure differential and hence velocity pressure also occurs at even low flow velocities thus providing a more sensitive measuring application. As can be realized, the amount of depression of the static pressure is related to the size of the downstream chamber and the location of the static sensing probe within this chamber. The static pressure probe should not be located too near either end of the downstream chamber.

The total pressure sensing probe is located in the center of the tube in the upstream chamber section and is parallel to the flow of gas with its opening facing upstream. By locating the total sensing probe near the center of the tube in the upstream chamber a more representative reading of total pressure is obtained. The tube, especially when tapered, acts as a flow collector and straightener, thereby providing a more representative reading of total pressure. The total sensing probe may be located anywhere in the upstream chamber section. Care should be taken in not loating the total pressure probe too near the upstream opening of the tube or else the advantages of the tube acting as a flow collector-straightener will not be realized. As mentioned above, the orifice in the upstream chamber of the tube may be constant or tapered. It is preferred that it be tapered. It is also preferred that the opening of the total pressure sensing probe be in the center of the wall dividing the tube into an upstream chamber and downstream chamber.

Other objects and advantages of the present invention along with the preferred embodiment and obvious modifications thereof will be described in more detail hereinafter, particularly with reference to the attached drawings.

Figure 1:
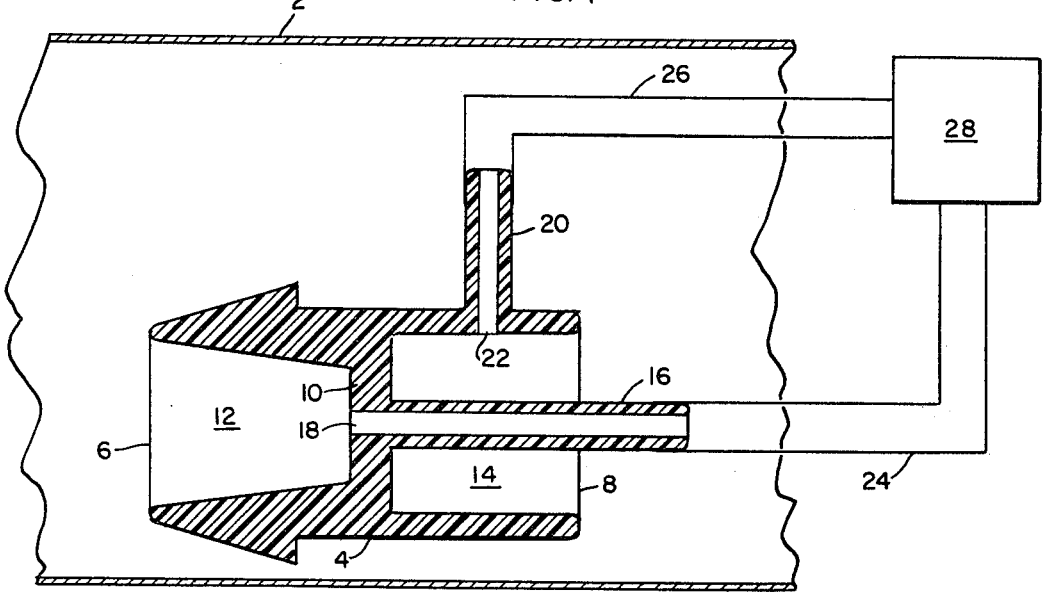
FIG. 1 is a somewhat schematic illustration of the preferred apparatus of the present invention.
Figure 2:
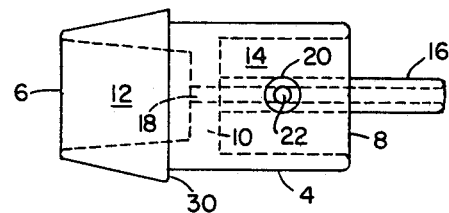
FIG. 2 is a side view of the sensor of the present invention.
Figure 3:
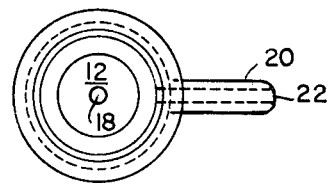
FIG. 3 is an end view of the sensor of the present invention.

With respect to FIGS. 1, 2 and 3, a tube 4 is provided in an air flow passage 2, not shown, through which a portion of the air flowing in the passage must pass. The tube has an upstream end 6 and a downstream end 8 with the opening of the tube being parallel to the direction of flow. A wall 10 divides the tube into an upstream chamber 12 and a downstream chamber 14. The oifice in the upstream chamber is preferably tapered inwardly to form a tapered chamber section 12. A total pressure sensing probe or tap 16 is positioned in the center of the tube and has its inlet opening 18 parallel to the flow of gas and facing upstream. The inlet opening is preferably located in the center of wall 10.

Wall 10 divides the tube into tapered upstream chamber 12 and downstream chamber 14. The orifice of downstream chamber 14 is preferably larger than the orifice at the tapered end of upstream chamber 12. The orifice of downstream chamber 14 is preferably constant across the remainder of the tube although it may be tapered inwardly or outwardly. A static pressure sensing probe or tap 20 is located in the walls of the tube in the downstream chamber. The inlet opening 22 of the static pressure probe is perpendicular to the flow of gas. Sensing probes 16 and 20 are connected by tubes 24 and 26, respectively, to control means 28. Control means 28 is responsive to the pressure differential sensed by probes 16 and 20 and is used to measure and/or control the flow of air through passage 2. Alternately, control means 28 may be replaced by a visual readout means. It should be noted that some control means may require that air be bled into the sensor through static probe 20. The flow measuring apparatus of the present invention is operable under these conditions.

With respect to FIGS. 2 and 3, the preferred sensor of the present invention described above is further illustrated in more detail. Tube 4 has an upstream end 6 and a downstream end 8. Wall 10 divides the tube into upstream chamber 12 and downstream chamber 14. The orifice in the upstream chamber is tapered inward and the orifice in the downstream chamber is constant. A total sensing probe 16 having an opening 18 parallel to the flow of gas and faing upstream is located in the center of the tube with the opening being in wall 10. A static pressure probe 20 is provided with its opening 22 located in the walls of the downstream chamber. The opening of the static pressure probe is perpendicular to the flow of gas and is located in the walls of the downstream chamber. Tube 4 also has a nipple 24 which is optional and which may be useful for holding the sensing device in an air duct.

Figure 4:
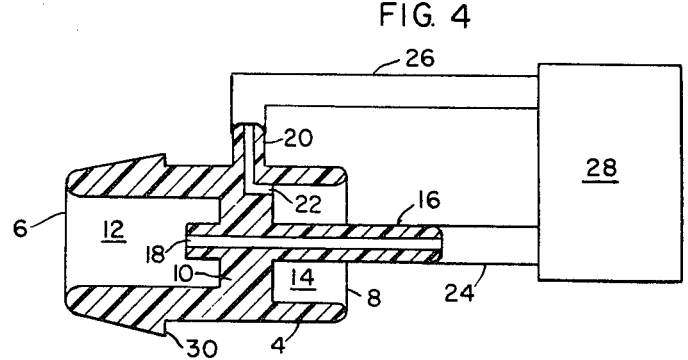
FIG. 4 is a somewhat schematic illustration of an alternate embodiment of an apparatus of the present invention.

With respect to FIG. 4, there is shown an alternate embodiment of the present invention. Tube 4 has an upstream end 6 and a downstream end 8. Wall 10 divides the tube into upstream chamber 12 and downstream chamber 14. The orifice in the upstream end is constant. A total pressure sensing probe 18 is located in the center of the upstream chamber and has its opening 18 parallel to the flow of gas and facing upstream. A static pressure sensing probe 20 is located in the downstream chamber. The opening 22 of static pressure probe 20 is located in wall 10 that divides the tube into chambers and is parallel to the flow of gas and facing downstream.

As would be realized, there are other embodiments of the present invention. The important feature of all the embodiments being the static pressure probe being located in the area of artificially reduced static pressure that is in the downstream chamber.

What is claimed:

1. A gas flow sensing device comprising a tube having an upstream end and a downsteam end and having an opening at each end thereof, a wall dividing the tube into an upstream chamber and a downstream chamber, a total pressure sensing probe located in the tube and having its opening in the center of the wall dividing the tube into the upstream and downstream chambers and facing upstream, a static pressure sensing probe located in the walls of the downstream chamber of the tube and having its opening perpendicular to the flow of gas, means for connecting the total pressure probe and static pressure probe to a visual readout means or a control means.

2. A gas flow sensing device as in claim 1 wherein the oriface of the upstream chamber is tapered inward.

3. A gas flow sensing device comprising a tube having an upstream end and a downstream end and having an opening at each end thereof, a wall dividing the tube into an upstream chamber and a downstream chamber, a total pressure sensing probe located in the tube and having its opening in the center of the wall dividing the tube into the upstream and downstream chambers and facing upstream, a static pressure sensing probe located in the wall dividing the tube into the upstream and downstream chambers and having its opening parallel to the flow of gas and facing downstream; means for connecting the total pressure probe and static pressure probe to a visual readout means or a control means.

4. A gas flow sensing device as in claim 3 wherein the oriface of the upstream chamber is tapered inward.

* * * * *

UNITED STATES PATENT AND TRADEMARK OFFICE
CERTIFICATE OF CORRECTION

PATENT NO. : 4,343,194

DATED : August 10, 1982

INVENTOR(S) : Marv L. DeHart; M. Leon Kloostra; Harold E. Straub

It is certified that error appears in the above-identified patent and that said Letters Patent are hereby corrected as shown below:

IN THE ABSTRACT:

Line 17, after "pressure" insert -- sensing --

Column 1, Line 35 delete "having" and insert -- that has --

Column 1, Line 41 after "total" insert -- pressure --

Column 1, Line 43 after "total" insert -- pressure --

Column 1, Line 46 after "into" insert -- the --

Column 1, Line 47 delete "sensins" and insert -- sensing --

Column 1, Line 50 delete "sensins" and insert -- sensing --

Column 1, Line 50 delete "be located" and insert -- have its opening --

Column 1, Line 54 after "velocity" insert -- pressure --

Column 1, Line 63 delete "pressure. This difference being" and insert -- pressure being --

Column 2, Line 6 delete "or" and insert -- of --

UNITED STATES PATENT AND TRADEMARK OFFICE
CERTIFICATE OF CORRECTION

PATENT NO. : 4,343,194

DATED : August 10, 1982

INVENTOR(S) : Marv L. DeHart; M. Leon Kloostra; Harold E. Straub

It is certified that error appears in the above-identified patent and that said Letters Patent are hereby corrected as shown below:

Column 2, Line 17 delete "application." and insert -- apparatus. --

Column 2, Line 18 after "related to" insert -- factors such as --

Column 2, Line 27 after "locating the" insert -- opening of --

Column 2, Line 34 delete "loating" and insert -- locating --

Column 2, Line 59 delete "not shown"

Column 2, Line 66 delete "to form a tapered chamber section 12." and insert -- so chamber 12 is tapered chamber section. --

UNITED STATES PATENT AND TRADEMARK OFFICE
CERTIFICATE OF CORRECTION

PATENT NO. : 4,343,194

DATED : August 10, 1982

INVENTOR(S) : Marv L. DeHart; M. Leon Kloostra; Harold E. Straub

It is certified that error appears in the above-identified patent and that said Letters Patent is hereby corrected as shown below:

Column 3, Line 21 delete "measuring" and insert -- sensing --
Column 3, Line 37 delete "24" and insert -- 30 --
Column 3, Line 45 delete "18" and insert -- 16 --

Signed and Sealed this

Eighth Day of February 1983

[SEAL]

Attest:

GERALD J. MOSSINGHOFF

Attesting Officer

Commissioner of Patents and Trademarks